United States Patent
Arimoto

[11] Patent Number: 6,093,892
[45] Date of Patent: Jul. 25, 2000

[54] CONDUIT END FITTING WITH AUTOMATIC LENGTH ADJUSTMENT

[75] Inventor: Shigeki Arimoto, Auburn Hills, Mich.

[73] Assignee: Hi-Lex Corporation, Battle Creek, Mich.

[21] Appl. No.: 09/128,004

[22] Filed: Aug. 3, 1998

[51] Int. Cl.$^7$ ..................................................... H01R 4/00
[52] U.S. Cl. ........................ 174/84 R; 174/86; 74/502.4
[58] Field of Search ................................... 174/86, 84 R, 174/75 C, 91; 74/502.4, 501.5 R; 188/196 R, 196 M, 196 B, 196 BA; 192/111 R, 111 B

[56] References Cited

U.S. PATENT DOCUMENTS

| | | | |
|---|---|---|---|
| 4,706,744 | 11/1987 | Smith et al. | 166/65.1 |
| 4,936,161 | 6/1990 | Polando | 74/502.6 |
| 5,295,408 | 3/1994 | Nagle et al. | 74/502.6 |
| 5,477,745 | 12/1995 | Boike et al. | 74/502.6 |
| 5,598,743 | 2/1997 | Yasuda | 74/502.4 |
| 5,746,094 | 5/1998 | Medebach et al. | 74/502.6 |
| 5,813,290 | 9/1998 | Takahashi et al. | 74/501.5 R |

*Primary Examiner*—Kristine Kincaid
*Assistant Examiner*—William H. Mayo, III
*Attorney, Agent, or Firm*—Young & Basile, P.C.

[57] ABSTRACT

An improved automatic length-adjusting end fitting for a cable assembly consisting of a conduit and a wire slidably positioned therein reacts to increases in the length of the wire and/or decreases in the length of the conduit by automatically lengthening the conduit to thereby take up a portion of the slack in the wire and return the cable assembly to its desired condition. The fitting includes a hollow housing and a cylindrical core disposed therein for sliding and rotating movement with respect to the housing. The conduit is connected to the end of the core and the wire extends completely through the core and housing. The outer surface of the core has three recesses, each of which forms a series of stair-step notches. Three axially aligned ridges are disposed on the interior surface of the housing engage respective notches, depending on how far the core is inserted into the housing. A coil spring urges the core outwardly from the housing and rotates the core to urge the ridges into engagement with the notches. When the slack in the wire increases beyond the desired amount, the spring forces the core outwardly until the ridges slide off the inner end of their notches and the spring rotates the core to bring the ridges into detented engagement with the next notch inward from that which they previously engaged.

25 Claims, 3 Drawing Sheets

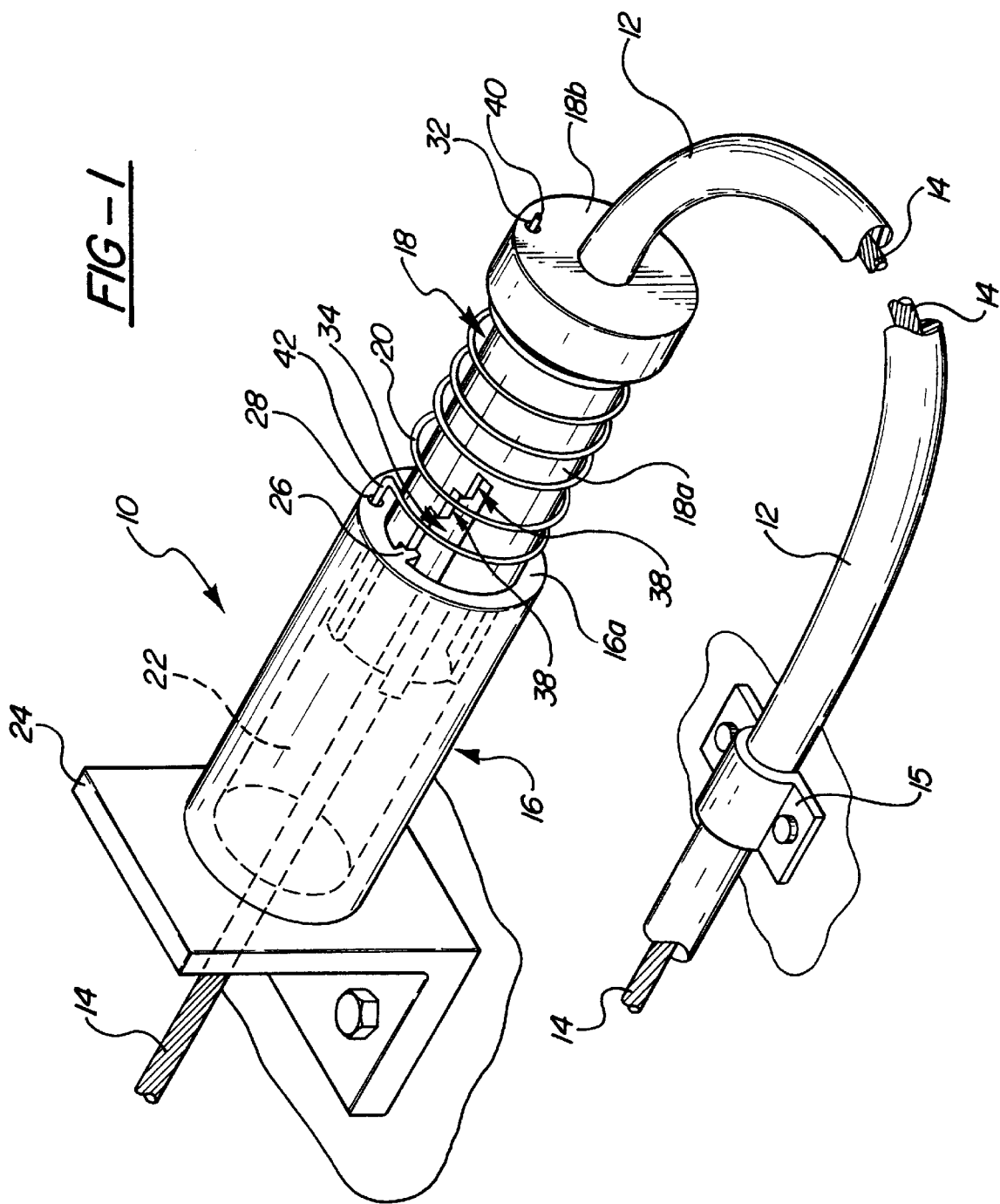

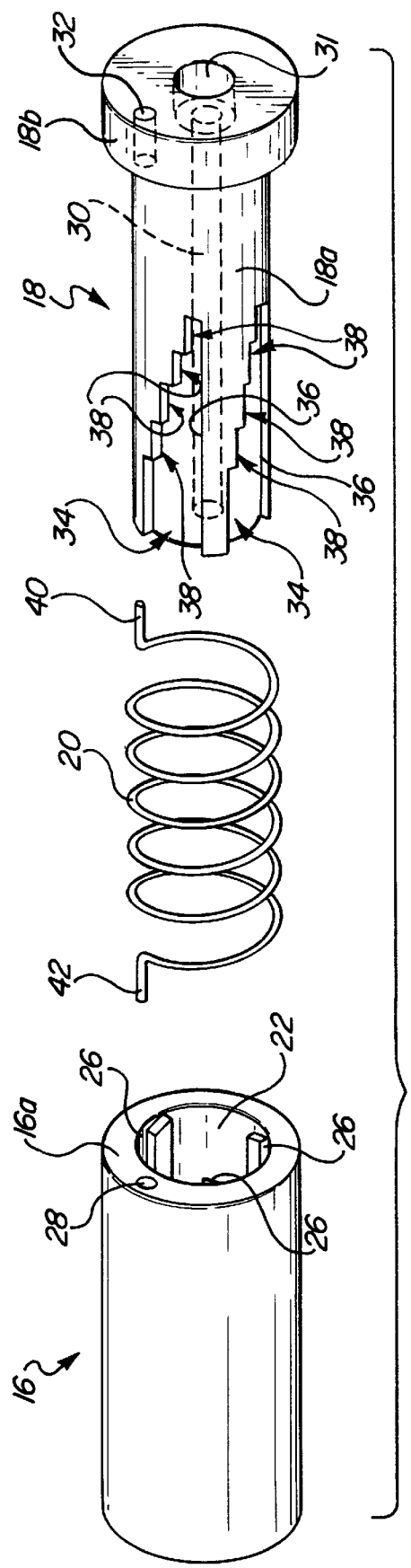
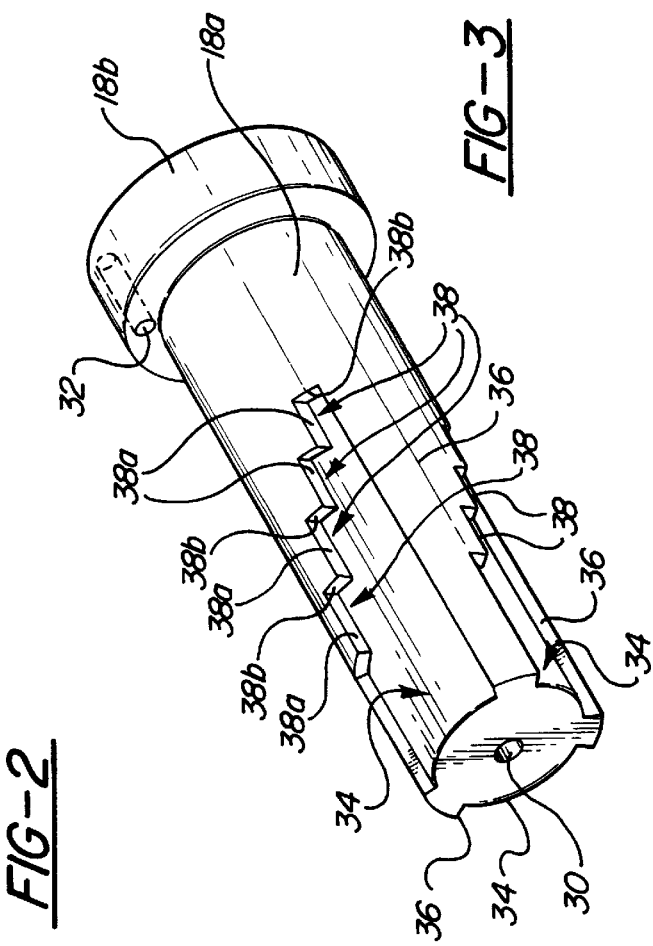

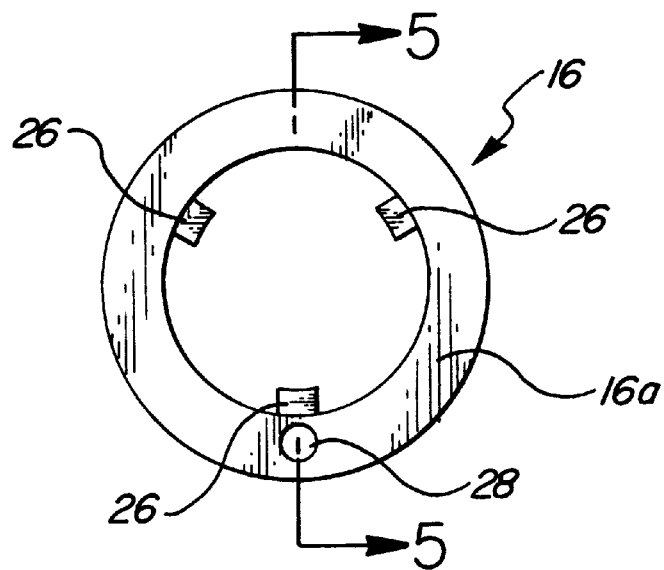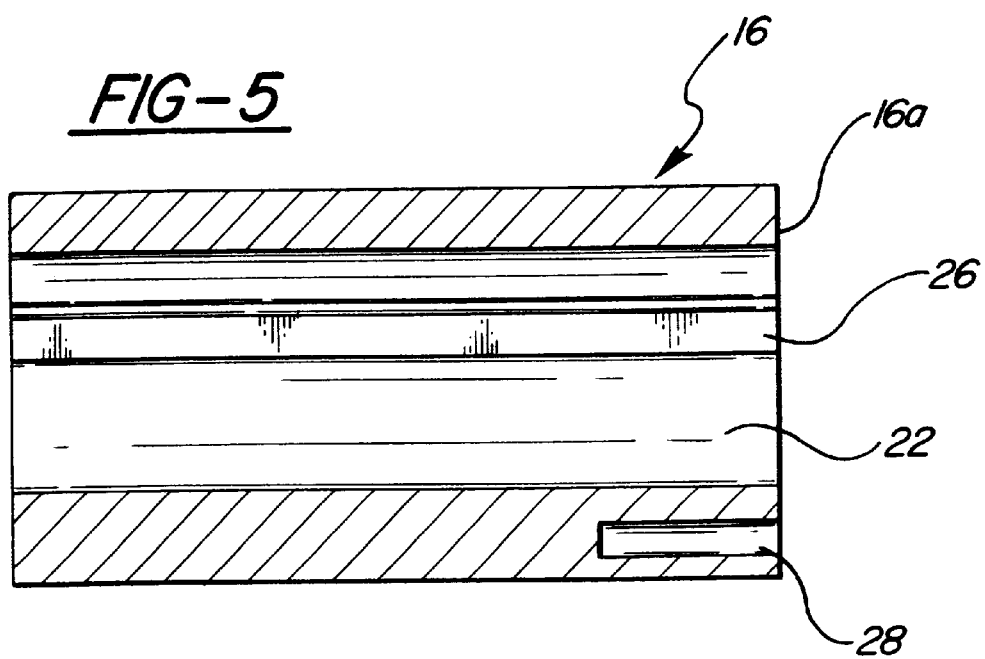

CONDUIT END FITTING WITH AUTOMATIC LENGTH ADJUSTMENT

FIELD OF THE INVENTION

This invention relates in general to cable end fittings and more particularly to a cable end fitting for automatically adjusting the amount of slack in a wire of a cable assembly including a conduit and a wire slidably positioned within the conduit.

BACKGROUND OF THE INVENTION

Cable assemblies comprising a hollow, flexible conduit and a wire slidably retained within the conduit are used in many applications where it is desired to transfer a linear, push/pull type of motion between remotely located elements of a mechanism. Cable end fittings are used to connect the ends of the conduit to relatively fixed structures, usually closely adjacent to the point where the wire is attached to the connected elements. Such cable assemblies and end fittings are commonly used in mechanisms such as automotive window regulators, throttle actuator assemblies, and automatic transmission shift linkages.

When a cable assembly is initially installed in its operating environment, the length of the wire is adjusted to be greater than the length of its surrounding conduit by an amount necessary for proper functioning of the mechanism. Although the wire would ideally be perfectly taut, a certain amount of slack in the wire must be included in the design to allow for manufacturing tolerances. During use, the wire is placed in tension so that some amount of stretching or elongation of the cable inevitably takes place. Simultaneously, the conduit is subjected to compression and so shortens by some small amount. Eventually the wire becomes too long relative t the conduit, such that the amount of slack in the wire is greater than the designed-for amount and consequently the cable assembly is unable to transfer linear motion with the degree of accuracy required for the mechanism in question. Excessive slack in the wire is of particular importance in certain mechanical applications, such as electronically controlled powered window regulators having an auto-reverse function.

End fittings which automatically correct for increases in the amount of slack in a cable assembly are known. One example of such an end fitting is disclosed in U.S. Pat. No. 5,746,094.

SUMMARY OF THE INVENTION

This invention is directed to the provision of an improved automatic length-adjusting end fitting for a cable assembly. More specifically, this invention provides a compact, inexpensive end fitting which reacts to increases in the length of a wire and/or decreases in the length of a conduit by automatically lengthening the conduit to thereby take up a portion of the slack in the wire and return the cable assembly to its desired condition.

The invention end fitting is intended for use with a cable assembly of the type including a conduit and a wire slidably positioned within the conduit. The fitting includes first and second portions disposed concentrically with one another for relative telescoping movement along a longitudinal axis, and means for urging the first and second portions toward an extended configuration. The first portion is connected to a relatively fixed structure and the second portion is connected to an end of the conduit such that the wire extends along the axis completely through the first and second portions.

According to the invention, one of the end fitting portions has a series of notches formed in a circumferential surface thereof, the notches being offset circumferentially and axially from one another to form a stair-step pattern, and the other of the portions has a locking projection extending therefrom into detented engagement with the notches. Biasing means rotates the first and second portions relative to one another about the longitudinal axis so as to urge the projection into detented engagement with one of the notches depending upon how far the first and second portions overlap one another along the axis.

Each notch has an axially disposed slide surface, and the locking projection is urged into contact with one of these by the biasing means. The first and second portions may move with respect to one another in the axial direction a distance equal to the length of the slide surface of the notch with which the locking projection is engaged. The length of the slide surface defines the allowable amount of slack in the wire.

The overall length of the fitting is prevented from decreasing by contact between the locking projection and a circumferentially disposed stop surface of the notch. However, if the slack in the wire increases beyond the desired amounts the spring extends the first and second portions with respect to one another until the locking projection slides off of the inner end of the slide surface of the notch. At this point the biasing means rotates the two portions to bring the locking projection into detented engagement with the next notch inward from that which the locking projection previously engaged. The locking projection may now slide back and forth along the slide surface of the second notch to permit the desired degree of slack in the wire.

In the preferred embodiment of the invention disclosed herein, the end fitting comprises a hollow housing having an axial bore extending along a longitudinal axis and a core disposed within the bore for sliding and rotating movement with respect to the housing. The conduit of the cable assembly is connected to the end of the core projecting out of the housing, and the wire extends completely through the core and housing. The outer surface of the core has three recesses, each of which forms a series of stair-step notches. Three axially aligned ridges are disposed on the interior surface of the housing and extend inwardly into the bore so as to engage respective recesses in the core when the core is slid into the housing. A coil spring is utilized to urge the core outwardly with respect to the housing and to rotate the core to urge the ridges into engagement with the notches.

The three locking projections and their respective recesses are disposed substantially evenly about the longitudinal axis of the fitting to insure that the core and housing are maintained in proper coaxial alignment with one another and may slide and rotate smoothly with respect to one another.

BRIEF DESCRIPTION OF THE DRAWINGS

FIG. 1 is a perspective view of an end fitting according to the invention in combination with a cable assembly;

FIG. 2 is an exploded view of the invention end fitting;

FIG. 3 is a perspective view of the core of the end fitting;

FIG. 4 is a front end view of the housing of the end fitting; and

FIG. 5 is a cross-sectional view taken along line 5—5 of FIG. 4.

DESCRIPTION OF THE PREFERRED EMBODIMENT

As seen in FIG. 1, the invention end fitting 10 is intended for use with a cable assembly of the type including a conduit 12 and a wire 14 mounted for sliding movement within the conduit 12. One end of the conduit 12 is secured to the end fitting 10, the wire 14 extending past the end-of the conduit 12 and completely through the end fitting 10. The other end of the conduit 12 is secured to a relatively fixed structure by a clamp 15. The end fitting 10 is utilized to reduce the amount of slack in the wire 14 by increasing the effective length of the conduit 12, thereby maintaining the length differential between the wire 14 and the conduit 12 within an acceptable range.

The end fitting 10 shown in FIGS. 1–5 includes a housing 16, a core 18 disposed partially within the housing, and a coil spring 20. The housing 16 is preferably cylindrical in shape and has an interior bore 22 extending along its longitudinal axis. The housing 16 is secured to a relatively fixed piece such as, for example, the bracket 24 shown in FIG. 1. Three circumferentially spaced ridges 26 are formed on the inner surface of the housing 16 and extend parallel to the longitudinal axis thereof. As best seen in FIG. 2, the forward ends of the ridges 26 are not flush with the annular front face 16a of the housing 16, but rather are beveled at a shallow angle from a circumferential line. A blind hole 28 is formed in the annular end face 16a of the housing 16.

The core 18 comprises a generally cylindrical body 18a of the proper outside diameter to fit within the housing 16 and a radially projecting flange 18b at one end thereof. A hole 30 extends along the central axis of the body 18a and is of sufficient diameter to allow passage of the wire 14. The end of the hole 30 adjacent the front face of the flange 18b is of an enlarged diameter to form a receptacle 31 (see FIG. 2) sized to receive the end of the conduit 12. A second hole 32 is formed through the flange 18b adjacent its periphery. Both the housing 16 and the core 18 are preferably made of a thermoplastic material, and may economically be fabricated by injection molding.

As best seen in FIGS. 2 and 3, the outer surface of the core body 18a has three substantially identical recesses 34 therein spaced evenly around the circumference of the body 18a. Each recess 34 is bounded on one side by a flat, axially disposed first edge 36 and on the other side by a series of relatively short notches 38 disposed in a stair-step pattern spiralling part way around the circumference of the body 18a. Each notch 38 has an axially disposed slide surface 38a and a shorter stop surface 38b which is skewed slightly from a circumferential line around the body 18a to form an undercut (see FIG. 3). The angle which the stop surface 38b makes with the circumference is equal to the angle of the bevel at the tips of the ridges 26 on the interior of the housing 16.

The coil spring 20 has an interior diameter slightly greater than the exterior diameter of the core body 18a. Both ends of the spring 20 are bent to form front and rear pins 40,42 projecting parallel to the longitudinal axis of the spring 20.

To assemble the end fitting 10, the end of the cable assembly is first mated with the core 18 such that the wire 14 extends through the central hole 30 of the core 18 and the conduit 12 is retained in the receptacle 31 at the end of the core. Next, the coil spring 20 is slid over the body 18a of the core 18 such that the front pin 40 projects into the hole 32 in the flange 18b, thus restraining the front end of the spring 20 against rotation relative to the core 18.

The core 18 is then placed in coaxial alignment with the bore 22 and the rear pin 42 of the coil spring 20 is inserted into the hole 28 in the end face 16a of the housing, thus restraining the rear end of the spring 20 against rotation relative to the housing 16. The core 18 is twisted clockwise (as viewed in FIGS. 1–3) with respect to the housing 16 to load the spring 20 in torsion, and then inserted into the bore 22 thereby compressing the coil spring 20. When the core 18 is released, the torsion force applied by the coil spring 20 rotates the core 18 with respect to the housing 16 and so urges the ridges 26 into contact with the slide surfaces 38a of their respective notches 38. Only the forward ends of the ridges 26 engage the slide surfaces 38a, but the rear portions of the ridges 26 contact the bottom surfaces of their respective recesses 34 to stabilize the core 18 within housing 16 and maintain proper concentric alignment between the two components.

During installation of the cable assembly into its operative environment, the end of the cable assembly remote from the end fitting 10 is connected to the appropriate structure and the length of the conduit 12 is adjusted to hold the core 18 in its inserted position within the housing 16 bore 22 against the force of the coil spring 20. The spring rate of the coil spring 20 and the combined overall length of the end fitting 10 and the conduit 12 are design factors that will be selected to ensure proper functioning of the mechanism, as will be apparent to one of skill in the art of linear actuators. Normally, these factors will be selected such that when the end fitting 10 is initially installed, the core 18 is held at the fully inserted position within the housing 16, with the ridges 26 engaging the notches 38 closest to the flange 18b. This allows the self-adjusting feature of the end fitting 10 to take up the maximum amount of slack as the cable assembly is used.

As the wire 14 stretches and/or the conduit 12 shortens during the operational life of the cable assembly, the coil spring 20 forces the core 18 outwardly from the housing 16, thereby maintaining the correct overall length of the conduit 12 and end fitting 10 relative to the length of the wire 14 and taking up the slack in the wire 14.

When the ridges 26 are engaged with any of the notch slide surfaces 38a, the core 18 may slide in and out relative to the housing 16 over a distance equal to the axial length of the slide surfaces 38a. This provides for an allowable amount of slack in the wire 14, as is made necessary by manufacturing tolerances in the various components. Accordingly, the lengths of the notch slide surfaces 38a are designed to be equivalent to the allowable amount of slack.

As the spring 20 urges the core 18 outwardly from the housing 16 in response to changes in the relative lengths of the wire 14 and conduit 12, the ridges 26 will eventually reach and move beyond the inner ends of the notch slide surfaces 38a with which they are engaged. When this occurs, the ridges 26 drop down past the ends of their respective stop surfaces 38b as the torsion force of the spring 20 rotates the core 18 counterclockwise to bring the ridges 26 into engagement with the next inward notch 38 in each series. When the ridges 26 are engaged with this next set of notches 38, the length of the slide surfaces 38a thereof again provides for the required amount of variation in the relative lengths of the wire 14 and conduit 12.

When the wire 14 of the cable assembly is placed in tension, the core 18 is drawn into the bore 22 against the force of the spring 20 until the allowable amount of slack provided by the notch slide surfaces 38a is taken up. This occurs when the tips of the ridges 26 are brought into contact with the stop surfaces 38b of their respective notches 38. It is only when the wire 14 is pulled beyond this point that it starts to be drawn through the conduit 12. The match between the angle on the bevelled tips of the ridges 26 and the undercut of the stop surfaces 38b ensures that the ridges 26 do not slip over the stop surfaces 38b and allow the core 18 rotate clockwise and so be pulled further into the housing 16.

The preferred embodiment of the invention end fitting disclosed herein is subject to many modifications without departing from the scope of the invention. For example, the recesses may be formed in the inner surface of the housing and the ridges may project from the outer surface of the core. Also, the notches need not be formed by a recess formed in one of the surfaces; rather, the slide and stop surfaces may be provided by a stair-step wall projecting a short distance above surface.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An end fitting for automatically adjusting an amount of slack in a wire of a cable assembly including a conduit inside which the wire is slidably positioned, the fitting comprising:

a hollow housing having an interior bore extending along a longitudinal axis thereof;

at least one locking projection disposed on the housing and extending into the bore;

a cylindrical core coaxial with the housing and having a first end disposed within the bore and a second end projecting from an end of the housing, the core slidable along the axis and rotatable about the axis with respect to the housing, the core having at least one recess in an outer surface thereof adjacent the first end of the core, one edge of the at least one recess comprising a series of notches offset circumferentially and axially from one another in a stair-step pattern spiraling around the core, each of the notches having a slide surface generally parallel to the axis and a stop surface angled with respect to a circumferential line around the core, the core being connectable to an end of the conduit such that the wire extends through the core and the housing;

means for urging the core along the axis outwardly with respect to the housing to urge the at least one locking projection into contact with the end surface of one of the notches depending upon how far the core is inserted into the bore; and means for rotating the core about the axis with respect to the housing so as to urge the at least one locking projection into detented engagement with the slide surface of the one of the notches.

2. The end fitting according to claim 1 wherein the housing has three locking projections disposed substantially evenly about the axis and the core has three recesses disposed substantially evenly about the axis.

3. The end fitting according to claim 1 wherein the urging means and the rotating means comprise a coil spring.

4. The end fitting according to claim 3 wherein the core has a flange extending radially outward therefrom adjacent its second end and the housing has a face adjacent its end, and the coil spring surrounds the core and is compressed between the flange and the face.

5. The end fitting according to claim 4 wherein a first end of the coil spring is fixed against rotation relative to the core and a second end of the coil spring is fixed against rotation relative to the housing, and the coil is loaded in torsion such as to apply a force tending to rotate the core relative to the housing.

6. The end fitting according to claim 1 wherein the slide surface of at least one of the notches has an axial length corresponding to an allowable amount of slack in the wire.

7. The end fitting according to claim 1 wherein the at least one locking projection has an end bevelled at an angle for engaging the stop surfaces of the notches.

8. The end fitting according to claim 1 wherein the at least one locking projection is a ridge extending parallel to the axis of housing.

9. An end fitting for automatically adjusting an amount of slack in a wire of a cable assembly including a conduit slidably receiving the wire, the fitting including a core disposed concentrically within a housing for relative telescoping movement along a longitudinal axis and means for urging the core toward an extended configuration relative to the housing, the housing connectable to a relatively fixed structure and the core connectable to an end of the conduit with the wire extending along an axis through the end fitting, the end fitting characterized in that:

one of the core or the housing has at least one series of notches disposed thereon, the notches being offset circumferentially and axially from one another to form a stair-step pattern, each of the notches having a slide surface generally parallel to the axis and a stop surface angled with respect to a circumferential line around the core or the housing a remaining one of said core or said housing has at least one locking projection extending from a circumferential surface thereof and detentingly engagable with the notches; and the end fitting further comprises biasing means for rotating the core and the housing with respect to one another about the axis so as to urge the at least one locking projection into said detented engagement with the slide surface of one of the notches depending upon how far the core and the housing overlap one another along the axis.

10. The end fitting according to claim 9 wherein the series of notches is formed by a recess in a surface of the first of the core and the housing.

11. The end fitting according to claim 9 wherein the housing has an interior bore extending along the longitudinal axis and the core is coaxial with the housing and has a first end disposed within the bore and a second end projecting from an end of the housing.

12. The end fitting according to claim 11 wherein the at least one series of notches is defined by a recess formed in an outer surface of the core.

13. The end fitting according to claim 11 wherein the at least one locking projection is a ridge extending parallel to the axis of housing.

14. The end fitting according to claim 9 wherein the urging means and the biasing means comprise a coil spring.

15. The end fitting according to claim 9 having three series of notches disposed substantially evenly about the axis and three locking projections disposed substantially evenly about the axis to engage respective of the three series of notches.

16. The end fitting according to claim 11 wherein the core has a flange extending radially outward therefrom adjacent its second end and the housing has a face adjacent its end, and the urging means comprises a coil spring surrounding the core and compressed between the flange and the face.

17. The end fitting according to claim 16 wherein a first end of the coil spring is fixed against rotation relative to the core and a second end of the coil spring is fixed against rotation relative to the housing, and the coil spring is loaded in torsion such as to apply a force tending to rotate the core relative to the housing.

18. A cable assembly comprising:

a conduit;

a wire slidably positioned within the conduit;

an end fitting housing having an interior bore extending along a longitudinal axis thereof;

at least one locking projection disposed on the housing and extending into the bore;

a cylindrical end fitting core coaxial with the housing and having a first end disposed within the bore and a second end projecting from an end of the housing, the core slidable along the axis and rotatable about the axis with respect to the housing, the core having at least one recess in an outer surface thereof adjacent the first end of the core, one edge of the at least one recess forming a series of notches offset circumferentially and axially from one another in a stair-step pattern spiraling around the core, each of the notches having a slide surface parallel to the axis and a stop surface angled with respect to a circumferential line around the core, the core being connected to an end of the conduit such that the wire extends through the core and the housing;

means for urging the core along the axis outwardly with respect to the housing to urge the at least one locking projection into contact with the stop surface of one of the notches depending upon how far the core is inserted into the bore; and means for rotating the core about the axis with respect to the housing so as to urge the at least one locking projection into detented engagement with the slide surface of the one of the notches.

19. The cable assembly according to claim 18 wherein the housing has three locking projections disposed substantially evenly about the axis and the core has three recesses disposed substantially evenly about the axis.

20. The cable assembly according to claim 18 wherein the urging means and the rotating means comprise a coil spring.

21. The cable assembly according to claim 20 wherein the core has a flange extending radially outward therefrom adjacent its second end and the housing has a face adjacent its end, and the coil spring surrounds the core and is compressed between the flange and the face.

22. The cable assembly according to claim 21 wherein a first end of the coil spring is fixed against rotation relative to the core and a second end of the coil spring is fixed against rotation relative to the housing, and the coil is loaded in torsion such as to apply a force tending to rotate the core relative to the housing.

23. The cable assembly according to claim 18 wherein the slide surface of at least one of the notches has an axial length corresponding to an allowable amount of slack in the wire.

24. The cable assembly according to claim 18 wherein the at least one locking projection has an end bevelled at an angle for engaging the stop surfaces of the notches.

25. The cable assembly according to claim 18 wherein the at least one locking projection is a ridge extending parallel to the axis of housing.

* * * * *